Feb. 21, 1939.  E. L. KOENIG  2,148,163
MOTION DETECTOR
Filed July 14, 1938  2 Sheets—Sheet 1
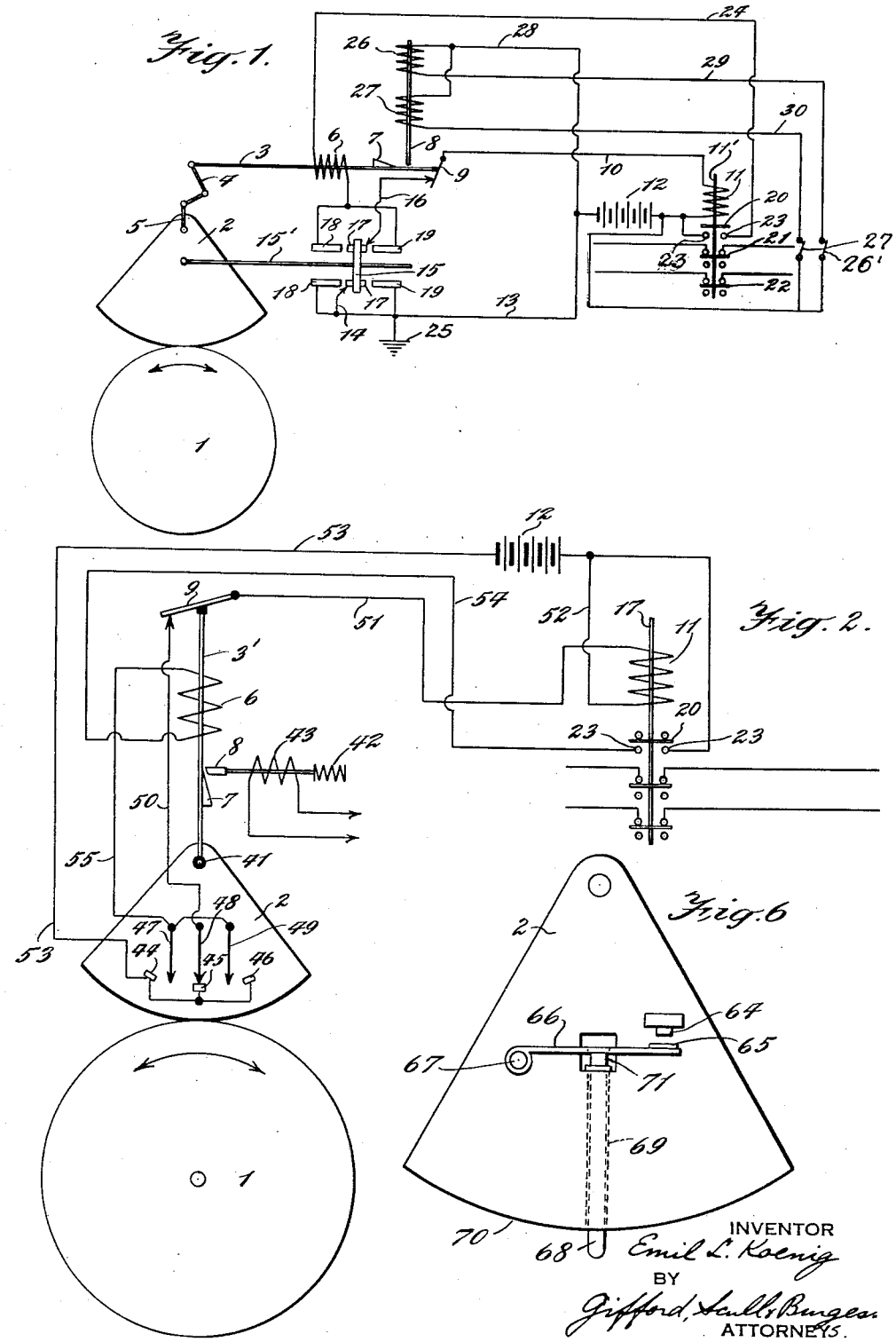

Feb. 21, 1939.  E. L. KOENIG  2,148,163
MOTION DETECTOR
Filed July 14, 1938  2 Sheets-Sheet 2
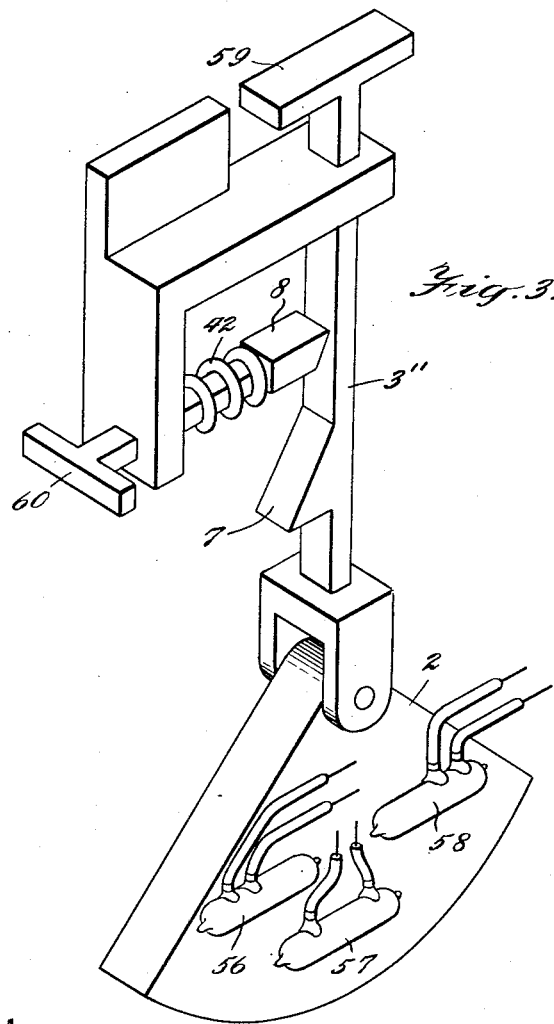
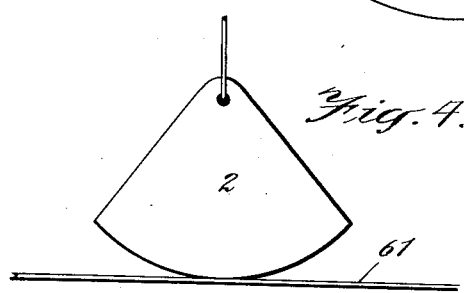
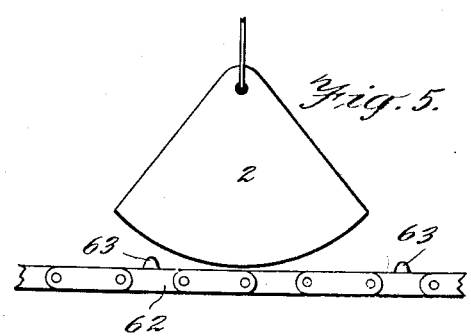
INVENTOR
Emil L. Koenig
BY
Gifford, Scull & Burgess
ATTORNEYS Patented Feb. 21, 1939

2,148,163

UNITED STATES PATENT OFFICE 2,148,163

MOTION DETECTOR

Emil L. Koenig, Brooklyn, N. Y.

Application July 14, 1938, Serial No. 219,270

6 Claims. (Cl. 175—320)

This invention relates to a novel and improved form of motion detector, the novel features of which will be best understood from the following description and the annexed drawings, in which I have shown a selected embodiment of the invention and in which:

Fig. 1 is a diagram illustrating one form of a detector and the circuit associated therewith;

Fig. 2 is a view similar to Fig. 1 but showing a different arrangement;

Fig. 3 is a perspective view of a slightly different form of detector adapted to be operated by hand;

Figs. 4 and 5 are fragmentary diagrams illustrating different ways in which the detector may be operated;

Fig. 6 is a diagram showing another arrangement of a switch mounted on a detector.

In the several figures, it should be understood that the various parts thereof are not intended to be shown to scale, as they are shown in a way which is deemed best for purposes of illustration. Moreover, it will be evident that the relative sizes of the parts may vary within wide limits and therefore the invention is independent of the exact size and proportion of parts.

Referring first to Fig. 1, I have indicated therein a moving part 1, which may be the axle of a car wheel, a car wheel itself, a shaft, an axle of an automobile, or in fact any rotating or oscillating member. For the purpose of convenience, I shall assume that this part 1 is the wheel of a railway car, and the wiring diagram of Fig. 1 is shown as adapted for use in a car or train having electrical controls for locking or operating the car doors as well as the brakes.

In Fig. 1 I have also shown a detector 2 in the form of a sector which is adapted to rest upon the part and having a rolling contact therewith. This sector is shown as supported on a horizontally movable rod 3 which is connected to the detector by means of a 90° bell crank lever 4 and a link 5, the link being pivotally connected to one arm of the bell crank lever and also pivotally connected to the sector. The rod 3 forms the plunger or armature of a solenoid or magnet 6 and is provided with a latch dog 7 adapted to engage a latch 8 shown as movable at right angles to the plunger. There are several devices shown in this application which for convenience I shall refer to as solenoids, although it is to be understood that by that term I do not mean to exclude magnets, the word "solenoid" for the purpose of this application being used broadly to include devices technically known as magnets.

The right-hand end of the plunger is shown as contacting with or operatively connected to a switch 9 which is closed when the detector engages the part 1. This switch is in a circuit comprising a conductor 10 leading through a solenoid 11 (for convenience hereinafter referred to as a relay) to one side of the battery 12. The circuit is completed by means of conductors 13 and 14, a movable bridge 15 and a conductor 16 leading back to the switch 9. The movable bridge is mounted upon a rod 15' pivotally connected to the detector 2 so that, as that detector rocks, the bridge 15 may bridge pairs of contacts 17, 18, or 19, depending upon the position of the bridge.

The relay 11 may be used to perform any desired function, but it is here shown as used to control various mechanisms on a railway car. For that purpose it holds in lifted position a plunger 11', on which are mounted a series of bridging contacts 20, 21, and 22. The contacts 20, 21 and 22 bridge pairs of contacts, as indicated, these contacts being in circuits which may be used to control any desired mechanism. For example, when the invention is used in a railway car, these circuits may control the door operating, door locking, or braking mechanism. Such circuits are well known in the art, and since their detail arrangement is not necessary to an understanding of my invention, I have not shown such details.

The bridging contact 20 is shown as being held by the relay 11 out of contact with two relatively stationary contacts 23. One of those contacts 23 is connected to the solenoid 6 by means of a conductor 24, and the solenoid 6 is connected at its other end to one contact of each pair of contacts 18 and 19. The other one of each pair of contacts 18 and 19 is connected to the other side of the battery 12 by means of the conductor 13, as plainly shown. A suitable ground connection is provided at 25 for use in railway cars.

To operate the latch 8, I have provided two solenoids 26 and 27 arranged in tandem. One end of each solenoid is connected to one side of the battery 12 by the conductor 28 and from the other end of the respective solenoids lead conductors 29 and 30 which may extend to remote control switches and thence to the other side of the battery 12.

In operation, assume that the parts are in the positions indicated in Fig. 1, with the detector lightly contacting with the part 1. Now if the part 1 moves even slightly, for example not more than 5° angular movement, this will cause a rocking of the detector 2 and a consequent movement of the connecting rod 15', enough to move the bridge 15 out of engagement with the pair of contacts 17 and into engagement with the pair of contacts 18 or 19, depending of course upon the direction in which the part 1 has moved. This will cause a breaking of the circuit between the contacts 17 and release the relay 11 so that the bridging contact 20 will engage the contacts 23, thus at this point closing the circuit through the solenoid 6. This circuit through the solenoid 6 has been completed by engagement of the bridge 15 with the pair of contacts 18 or 19, as the case may be.

The circuit through the solenoid 6 now being closed, this solenoid will be energized and its winding is such that upon being energized the plunger 3 will be moved towards the right of Fig. 1 until the latch dog 7 passes the bottom of the latch 8. This will result in lifting the detector 2 out of engagement with the part 1 and holding it in that position, it being understood that the latch 8 will engage the dog 7. In practice, the latch 8 is either spring-pressed towards the plunger 3 or is urged towards it by gravity. Similarly, the plunger 11' may move downwardly by gravity or by the action of a spring or both. As soon as the detector 2 is lifted out of engagement with the part 1, it will be evident that it will rock back to the approximate position shown in the drawings, it being remembered that the detector is pivotally connected to the link 5, as stated above. This action of the detector will cause an opening of the circuit through the solenoid by movement of the bridge 15, as described later.

Movement of the plunger 3 towards the right will open the switch 9 and thus insure that the relay 11 will be de-energized so long as the detector is out of contact with the part 1.

As previously noted, the solenoids 26 and 27 are arranged in tandem and either one may be operated by a remote control device 26' or 27' in one of the conductors 29 or 30. Of course, while only two solenoids are shown for operation by two remote control devices, more solenoids may be employed if desirable, or one only may be used. On energizing either the solenoid 26 or 27, the latch 8 will be lifted and then the weight of the detector 2 will cause it to drop into engagement with the part 1. Until such time, the detector 2 will be held out of such engagement. For example, by a remote control device, the detector may thus be placed in contact with the part 1 where it will remain until the solenoid 6 is again energized. So long as the detector is in contact with the part 1, any slight movement thereof not only will de-energize the relay, but in so doing will open the switch formed by the bridging contacts 21 and 22, which may be used to give an alarm, set an emergency brake, lock or unlock a door or perform any other desired function. Thus at the same time and by the same action of the detector, some such desirable function is performed and the detector is raised out of operative position. As noted above, as soon as the detector is raised out of contact with the part 1, it will at once swing back to its central position so that the circuit through the solenoid 6 will be broken either at the contacts 18 or 19, as the case may be, and at the same time the bridge 15 will once more engage the pair of contacts 17 and the parts will be in position to repeat their cycle of operations except that the switch 9 is opened, being held open by the plunger 3. As soon as one of the remote control devices releases the latch 8, the detector is again permitted to return to engagement with the part 1.

Referring now to Fig. 2, I have shown therein a rotating part 1 and a detector 2 of the same form as before. I have also shown a relay 11 controlling operation of the plunger 17 which may be used to control suitable circuits which may be of the same kind as described in connection with Fig. 1, or may be used to control any other mechanism which is desirable. Therefore no further mention will be made of the functions which may be controlled by the circuits.

In the arrangement shown in Fig. 2, however, the sector is connected with a vertically extending plunger 3' to which it is pivoted at 41. This plunger is provided with a latch dog 7 adapted to be engaged by a latch 8, which is shown as resiliently urged towards the plunger by means of a compression spring 42. The latch is controlled by a solenoid 43 which may be operated by any remote control device adapted to energize the solenoid and the details of which are not necessary to an understanding of the invention.

So far as practical, the same numerals have been used in the circuit of Fig. 2 as in the circuit of Fig. 1. However, there are certain differences which will be discussed briefly.

On the face of the detector are contacts 44, 45, and 46 which are fixed on the detector to move therewith. I have also shown diagrammatically three pendulum contacts 47, 48, and 49 which are pivotally mounted on the detector so that, as the detector swings on its pivot 41 upon movement of the part 1, these contacts 47, 48, and 49 will remain substantially vertical. In the position shown, the middle pendulum 48 is in engagement with contact 45, thus closing a circuit through the conductor 50, switch 9, conductor 51, relay 11, conductor 52, battery 12, and conductor 53. Now assuming that the detector moves on its pivot because of rotation of the part 1, then the first thing that happens is breaking of the circuit just described between the contacts 48 and 45. This at once de-energizes the relay 11, releasing the plunger 17 so that the contact 20 will bridge the contacts 23, thus closing the circuit through the battery 12, bridge contact 20, conductor 54, solenoid 6, conductor 55, one of the pair of contacts 47—44 or 49—46, and conductor 53, depending upon which direction the detector has moved.

Energizing of the solenoid 6 will at once raise the detector out of engagement with the part 1 where it will lock by means of a latch 8 so long as the solenoid 43 is de-energized. As soon as the detector is raised out of contact with the part 1, it will at once swing back to central position wherein the contacts 48 and 45 will engage so as to be ready for the next operation.

The arrangement of switches shown in Fig. 2 may be taken as exemplifying mercury switches which may be conveniently mounted on the face of the sector forming the detector. Such an arrangement is shown in perspective in Fig. 3 wherein the three switches shown in Fig. 2 are indicated at 56, 57, and 58, these corresponding respectively to the switches formed by the contacts 44—47, 45—48, and 46—49.

In Fig. 3 is also shown an arrangement of the plunger 3", which may not only be operated by a solenoid (not shown) in the manner previously described, but may also be operated by hand through a handle 59. In this connection it is to be understood that the operation of the device by solenoids is only illustrative, as other electrical or machanical devices may be used without departing from the scope of the invention. For example, an electro-pneumatic arrangement may be employed. Likewise, the latch 8 may be operated against the spring 42 by means of a handle 60, this handle being used to reset the detector. It should be understood that this resetting thus may be done by hand or through any remote control device, either manually controlled or automatically controlled. For example, if the invention is to be used on a railway car, the resetting may be done automatically when the car comes to a stop. On the other hand, for example, if the invention is to be used on an automobile, the resetting may be done by hand when the driver leaves the car. Similarly, the device may be set automatically in an automobile by opening of a door of the car. In fact, the invention has so many possible uses that no attempt will be made to list them, much less to describe them in detail.

In Fig. 6 I have shown another form of switch on the detector. In this instance, the switch is formed by a contact 64 fixed on but insulated from the detector 2 and a movable contact 65 shown as mounted upon a lever 66 pivoted to the detector as at 67, and also insulated from the detector. A plunger 68 may be slidably mounted in a bore 69 in the detector. So long as the arcuate surface 70 of the detector is in engagement with the part 1, the plunger 68 will hold the contacts 64 and 65 in engagement with each other, but when the detector is lifted out of engagement with the part 1, then the plunger 68 will move to some such position as indicated in Fig. 6, either by gravity or by action of a spring or both, this movement being limited in any suitable way, for example by connecting the plunger to the spring 66 or by providing a head 71 on the plunger of such size that it will not enter the bore 69.

In Fig. 4 I have shown the detector 2 as in engagement with a belt 61 instead of in engagement with a rotating part. For example, in any mill where movement of a belt should be prevented except under certain conditions, the detector may thus be placed in contact with the belt and automatic electrical control mechanism be provided to throw a clutch or apply a brake to stop movement of the belt almost instantaneously.

In Fig. 5 I have shown another possible use of the invention in which I have indicated the detector 2 employed with a chain 62 having lugs 63 mounted thereon. During movement of the chain, these lugs may engage the sector closing an electric switch to operate any desired mechanism.

From the above it will be seen that I have provided a detector which is instantaneously responsive to movement of a certain part and which upon movement of that part will instantaneously set in motion any desired mechanism, after which it will be at once removed from contact with the moving part. Thus any appreciable wear on the detector is avoided. The detector also is held out of engagement with the moving part until deliberately reset in engagement therewith. In the meantime the necessary steps may be performed either automatically or manually to create the correct conditions for continued movement of the movable part.

While I have shown the invention as embodied in a specific form, it is to be understood that various changes in details may be made without departing from the scope of the invention, as defined by the appended claims.

I claim:

1. In combination, a movable part, a detector movable into and out of contact with said part and movable thereby when in contact therewith, means to move said detector out of contact with said part, an electric circuit controlling said means, a switch in said circuit, means to operate said switch by movement of said detector by said part, when in contact therewith, to actuate said first-named means.

2. In combination, a movable part, a detector movable into and out of contact with said part and movable thereby when in contact therewith, a solenoid adapted when energized to move said detector out of contact with said part, an electric circui including said solenoid, a switch in said circuit, and means operable by movement of said detector by said part, when in contact therewith, to close said switch to energize said solenoid.

3. In combination, a movable part, a detector movable into and out of contact with said part and movable thereby when in contact therewith, a solenoid controlling movement of said detector into and out of contact with said part, an electric circuit including said solenoid and having a switch therein, and means operable by movement of said detector by said part, when in contact therewith, to operate said switch.

4. In combination, a movable part, a detector movable into and out of contact with said part and movable thereby when in contact therewith, means to move said detector out of contact with said part, an electric circuit controlling said means, a switch in said circuit, means to operate said switch by movement of said detector by said part, when in contact therewith, to actuate said first-named means, a latch adapted to hold said detector out of contact with said part, and means to release said latch to reset said detector in contact with said part.

5. In combination, a movable part, a detector movable into and out of contact with said part and movable thereby when in contact therewith, a solenoid adapted when energized to move said detector out of contact with said part, an electric circuit including said solenoid, a switch in said circuit, a relay which, when energized, holds said switch open, a circuit including said relay and having a switch therein, and means operable by movement of said detector by said part, when in contact therewith, to open the switch in said relay circuit.

6. In combination, a movable part, a detector movable into and out of contact with said part and movable thereby when in contact therewith, means to move said detector out of contact with said part, an electric circuit controlling said means, a switch in said circuit, means to operate said switch by movement of said detector by said part, when in contact therewith, to actuate said first-named means, one or more other circuits, each having a switch therein, and means to operate said switches in said other circuits substantially simultaneously with operation of said first-named switch.

EMIL L. KOENIG.